Jan. 16, 1951 W. K. VOLKERS 2,538,488
SELF-FOCUSING, DIRECT-COUPLED AMPLIFIER
Filed April 29, 1947 3 Sheets-Sheet 1
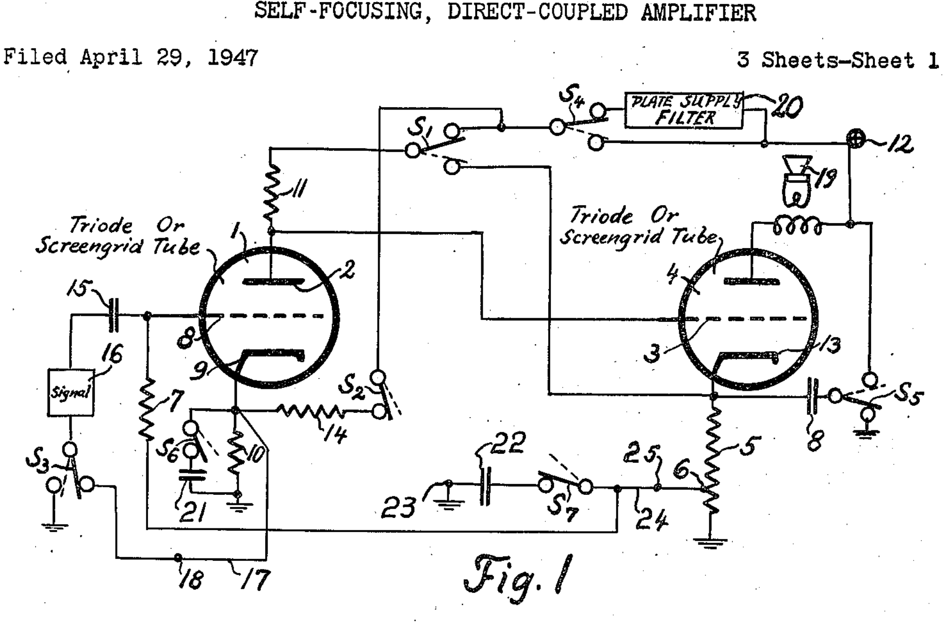
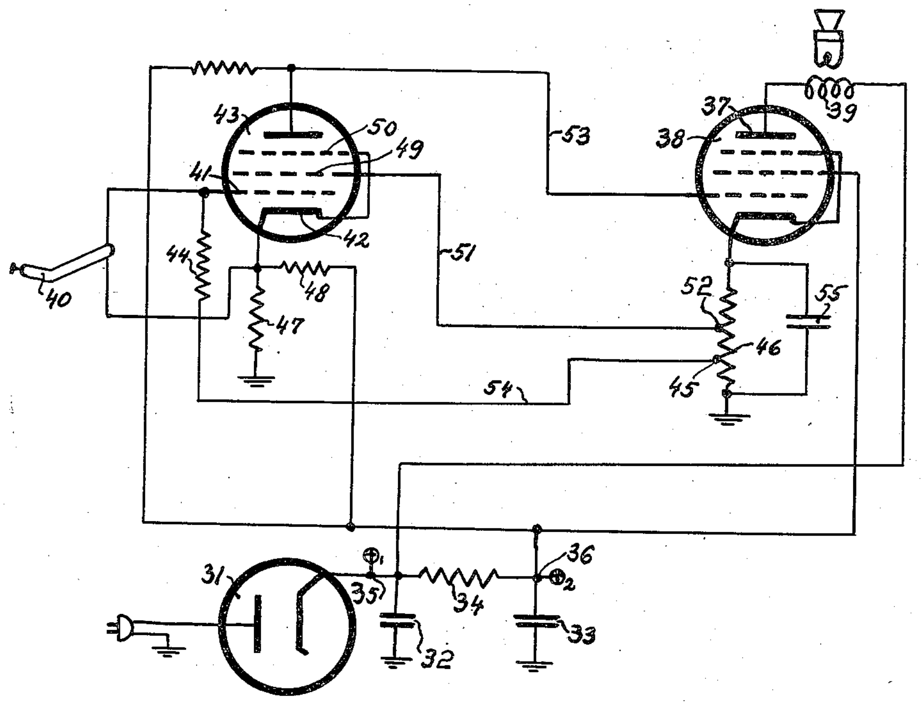
Fig. 2
Inventor
Walter K. Volkers
Ralph B. Stewart
Attorney Inventor
Walter K. Volkers
Ralph B. Stewart
Attorney Inventor
Walter K. Volkers.

Ralph B. Stewart
Attorney

Patented Jan. 16, 1951 2,538,488

UNITED STATES PATENT OFFICE 2,538,488

SELF-FOCUSING DIRECT-COUPLED AMPLIFIER

Walter K. Volkers, Schenectady, N. Y., assignor to Volkers & Schaffer, Inc., a corporation of New York Application April 29, 1947, Serial No. 744,658

12 Claims. (Cl. 179—171)

My invention relates to self-focusing circuits for direct-coupled amplifiers in which the D. C. component of a mixed A. C.-D. C. signal, appearing at the control grid of an output tube, is degeneratively fed back to an input stage in order to re-focus the plate-current of the output tube which, otherwise, might produce clipping or other distortions if a strong A. C. signal is being handled by the output stage.

Direct-coupled amplifiers have, in the past, been employed on a comparatively small scale, preference having been given to R/C-coupled, L/C-coupled and transformer-coupled circuits. Inadequate self-focusing ability and higher manufacturing costs are considered to have been the principal hurdles which the direct-coupled amplifier has, so far, been unable to pass when competing with other types of amplifiers.

Having recognized these inherent inadequacies of direct-coupled amplifiers in comparison with other amplifiers I have made an important object of my invention the achievement of a substantial increase of the D. C. feedback-action in such direct-coupled ampliers in order to provide a more pronounced self-focusing effect than has been obtained hitherto. Thus, my new and improved self-focusing circuits not only cancel D. C. components of mixed A. C.-D. C. signals to a degree which could not be obtainable by earlier self-focusing methods, but, in addition, they eliminate, for all practical purposes, the well-known defocusing effects caused by cathode drifts, tube-vacuum changes, resistor manufacturing inaccuracies and changes due to aging, tube-tolerances when installing new or replacing old tubes, etc. These and other defocusing influences may be looked upon as being the equivalent of erratic D. C. components of the mixed A. C.-D. C. signal appearing at the control grid of the output tube. Thus, even if the input signal circuit, by virtue of its design, should not permit any D. C. components to be passed on to the control grid of the input tube, these erratic drifts may, nevertheless, be considered to be the equivalent of D. C. components to which the output tube is exposed and which, by means of my new vigorous self-focusing circuit, can be made to cancel themselves, or nearly cancel themselves, as far as deviations of the output tube's plate current from its assigned "focus" are concerned.

My invention is based on the recognition of the fact that in a direct-coupled amplifier a fully effective self-focusing effect can be produced only if the circuit of the input tube is free from connections which by themselves cause a self-adjustment of the input tube's plate current. I have named these connections "focus-traps" and I have found that they weaken the input tube's ability and tendency to vary its plate voltage whenever the plate-current of the output tube deviates from its focus. Thus, the input tube will transmit a less effective re-focusing impulse to the control grid of the output tube than it would if its own circuit were free from focus-traps.

Another object of my invention is a simplification of circuits and reduction of circuit elements required for the construction of such self-focusing direct-coupled amplifiers in order to put them on a competitive basis with R/C and L/C coupled amplifiers.

A further object of my invention is to insure minimum distortions combined with maximum gain and power-output in self-focusing direct-coupled amplifiers.

Additional objects and features of my invention will reveal themselves in the following detailed description and claims as well as the accompanying drawing in which Fig. 1 shows a two-stage direct-coupled amplifier containing various focus-traps which by operating certain switches can, according to my invention, be eliminated.

Fig. 2 illustrates how the principles of my invention can be applied to pentodes.

Figures 3, 4:
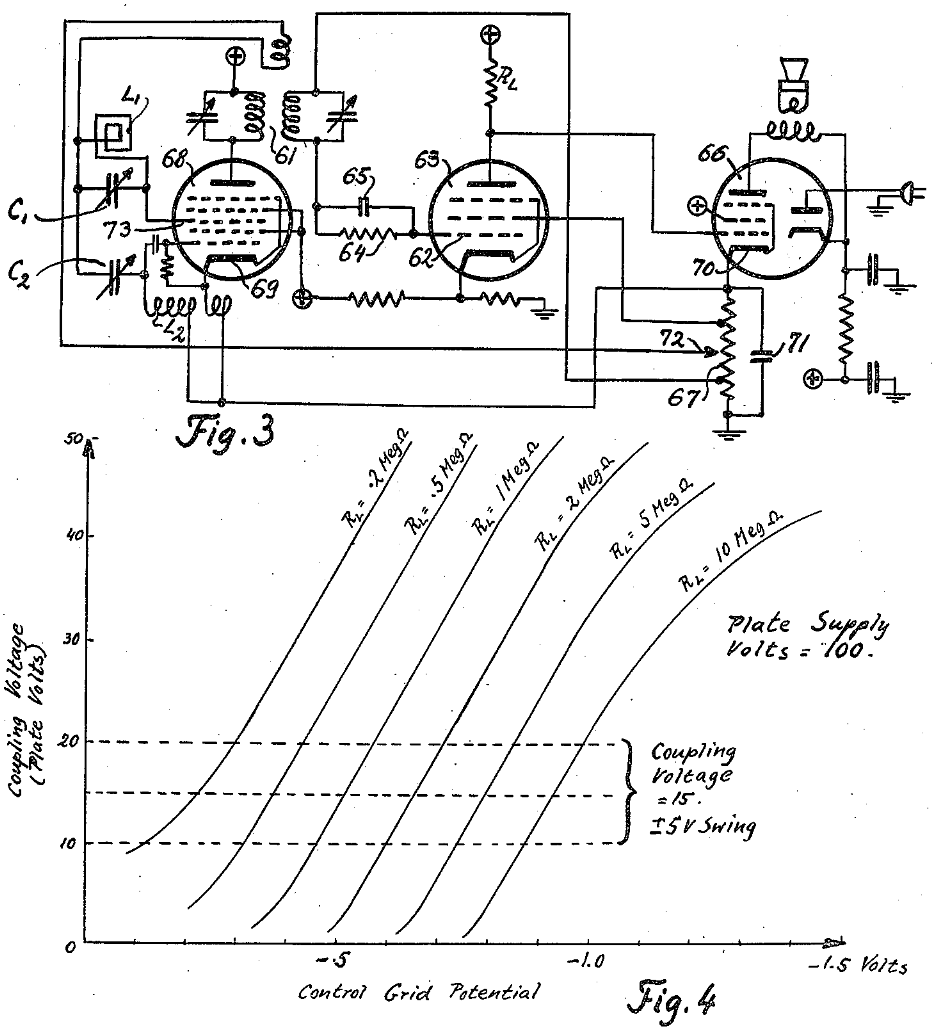
Fig. 3 shows a simple superheterodyne radio-receiver equipped with a self-focusing direct-coupled audio-amplifier and a special type of volume-control.
Figures 5, 6:
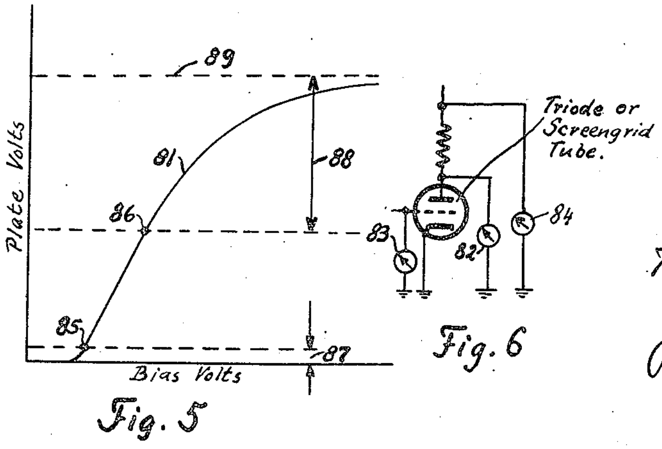

Figs. 4, 5 and 6 finally illustrate a new method of operating audio-amplifier-input-tubes on their "lowered-lower-bend-characteristic" in order to reduce distortions and increase the amplifier's maximum power output.

The two-stage direct-coupled amplifier in Fig. 1 has an input tube 1 the plate 2 of which is connected directly to the control grid 3 of the output tube 4. The latter has an oversize cathode resistor 5 which provides a voltage drop equal to the sum of the input tube's plate voltage and the output tube's bias potential. Self-focusing action is being obtained by tapping the cathode-resistor 5 at point 6 and connecting the lower end of the input tube's grid-leak 7 to this point. Since cathode resistor 5 is by-passed by a condenser 8, voltage-variations at its tap will substantially reproduce the D. C. component only of any mixed A. C.-D.C.-signal which reaches the control-grid 3 of the output tube 4 and which is being amplified by the latter. Such D. C. potential deviations at point 6 raise or lower the bias potential of the input tube's control grid 8 and, by being amplified through the input tube 1 and output tube 4, they are made to cancel or nearly cancel themselves in the output current. Since point 6 on the output tube's cathode resistor has a positive potential against ground, it is necessary to match this positive potential with a corresponding or larger positive input-tube cathode-potential. Accordingly, cathode 9 of input tube 1 is grounded through an oversize cathode resistor 10 which provides a voltage drop equal to the sum of the control grid's positive potential against ground and the tube's bias.

The circuit shown has seven switches which illustrate a number of possible variations in its connections. It shall be understood that in accordance with my invention switches $S_1$ and $S_2$ should be placed in their upper and left positions, respectively as illustrated. Thus, two possible focus-traps are being avoided and the circuit becomes vigorously self-focusing. The positions of the other five switches are optional.

The performance of this circuit shall be described, together with the functions of its various switches, as follows:

*Switch $S_1$.*—In its upper position shown, which according to my invention must be used, the plate 2 of the input tube 1 is, through its load resistor 11, connected to the positive terminal 12 of the plate power supply. This power supply also energizes the plate circuit of the output tube. Any increase in plate current drawn by the output tube has therefore a certain tendency to lower the input tube's plate supply voltage as well as the input tube's plate voltage. According to the size of the common power supply, this tendency might be almost negligible or it may be so strong that it produces a noticeable plate-to-plate self-focusing effect between the two tubes. In the latter case any output-current-increase would, through the resulting voltage drop of the common power supply, lower the input tube's plate voltage which is identical with the output tube's control grid voltage, thereby reducing the output current to some extent and thus refocusing the output circuit. More important than this self-focusing tendency described is, however, that with switch $S_1$ in its upper position the circuit does not possess the self-defocusing properties which it has as soon as switch $S_1$ is placed in its lower position.

In its lower position switch $S_1$ connects the plate 2 of the input tube, again through its load resistor 11, to the cathode 13 of the output tube. This plate-supply connection which has been suggested in U. S. patents to White 1,789,664 and 2,032,193 makes the output tube's bias the input tube's plate supply. Besides thus providing exceptionally low plate supply voltages for the input tube and thus sacrificing a certain amount of possible gain, this plate-supply circuit is a power focus-trap since output-current increases raise the output-tube's cathode potential, thereby creating a tendency of raising the input tube's plate potential and the output tube's control grid potential. The input tube is in this manner deprived to a considerable extent of its ability of amplifying and counteracting output current variations and neutralizing them by feeding them back into the control grid of the output tube. The circuit would be practically non-self-focusing and, for all practical purposes, useless if its other self-focusing branch between tap 6 on the output tube's cathode resistor and the control grid of the input tube would not provide a fairly strong self-focusing effect. One should, however, bear in mind that this effect is constantly being watered down by the cathode-to-plate de-focusing effect just described. Having recognized this condition, I therefore specify that switch $S_1$ should be used in its upper position in which no de-focusing action exists.

*Switch $S_2$.*—In its left position shown which, according to my invention, must be used this switch connects a "preloading resistor" 14 between the cathode 9 of the input tube and the positive power supply terminal 12, thereby adding to the tube current flowing through cathode resistor 10 a "preloading current" which creates a tendency of raising the input tube's cathode potential. Since, on the other hand, a specific positive cathode potential is required in order to match the positive grid-bias taken from tap 6, it follows that cathode resistor 10 of the input tube should be reduced according to the ratio of the tube's current to the sum of the preloading current and the tube's current. Thus, if the preloading current should, for instance, be four times larger than the tube-current, the cathode resistor could and should be reduced to one-fifth of its original value. Since degeneration, caused by cathode-resistor-voltage-drop, is directly proportionate to the size of the cathode resistor, it would, in this case, be reduced to 20% of its original value. Degeneration, on the other hand, is in this particular case another focus-trap which should not be neglected. Thus, assuming for the moment that cathode-resistor 10 of the input tube is not being preloaded and that switch $S_2$ is in its right hand or open position, the input tube, through degeneration, would partially evade its assigned role of setting the output tube's plate current back near its focus whenever an erratic D. C. potential appears at the output tube's control grid or the output current wanders off for any other reason.

Therefore, by preloading the input tube's cathode resistor with switch $S_2$ in its left position, and by reducing degeneration accordingly, the circuit can be made to self-focus as vigorously as desired provided switch $S_1$ is in its proper upper position at the same time. Either of these two circuit branches can fulfill its assigned function properly only if the other is prevented from providing a focus-trap. Thus, the effect is not simply doubled if both switches are in their correct positions, but it is substantially more fortified.

An additional self-focusing effect is, incidentally, produced through favorable automatic variations of the preloading current passing through resistors 14 and 10. Thus, for instance, if the output current increases, this lowers the common plate supply voltage and decreases the preloading current flowing through resistors 14 and 10. This creates a tendency of lowering the input tube's cathode potential and raising that tube's current, which would lower its plate voltage and the output tube's control grid potential, which in turn would lower the output tube's plate current.

The amount of input-tube-cathode-preloading desired depends upon various factors including the position of tap 6 on the output tube's cathode resistor. Usually a preloading current three to five times larger than the input tube's cathode current will be found to be sufficient, although in other cases, particularly if the input tube's cathode resistor remains unbypassed, it may be desirable to increase the rate of preloading to ten, fifty or even one hundred times the tube current in order to avoid noticeable A. C. degeneration in this tube.

*Switch* $S_3$.—This switch may be used in either its left position, in which the input signal circuit is connected between the input tube's control grid 8 and ground in a conventional manner, or, according to one of the preferred forms of my invention, in its right position, in which the input signal circuit is connected between the input tube's control grid 8 and the input tube's cathode 9. This latter connection requires, however, that the input signal circuit have a high D. C. impedance which might be produced by inserting a condenser 15 in series with the other circuit elements 16 of the input signal circuit. If the input signal circuit comprises a natural high D. C. impedance element such as a crystal pickup or microphone, the series condenser mentioned may be omitted. In other cases it may also, of course, if so desired, be inserted in any other convenient location of the input circuit, for instance, the cathode lead 17 at point 18.

An advantage of this "floating input" circuit with switch $S_3$ in its right position as compared to "solid input" with the switch in its left position is that any hum or A. C. ripple which the preloading current flowing through resistors 14 and 10 might contain will create less hum in the loudspeaker 19 if the input tube's control grid 8 is fairly firmly tied to the cathode 9 through an input signal circuit of sufficiently low A. C. impedance. In the same manner any non-intentional negative feedback of A. C. signal components from tap 6 of the output tube's cathode resistor to the input tube's control grid 8 would be reduced by tying the cathode and control grid of the input tube more closely together through the signal input circuit. Thus, switch $S_3$ in its right position performs several functions which improve the overall performance of the amplifier.

*Switch* $S_4$.—Through this switch, in its upper position, a plate-supply-filter 20 can be inserted into the plate circuit of the input tube as well as the cathode-resistor-preloading-circuit of the input tube. This arrangement acquires particular significance if the plate circuit of the output tube is being energized from a "raw" plus-supply. If the output tube should be a screen-grid tube, its screen may also be connected to the left end of the plate supply filter 20 whilst its plate circuit may remain connected to the raw supply. Even then there will be in existence the possibility of obtaining additional self-focusing action from the lowering of plate supply voltage common to both tubes as a result of an increase of the output tube's plate current. Since both the output tube's plate current and its screen current are a function of the output tube's control grid voltage the output tube will not only draw a heavier plate current, but also a heavier screen current if the control grid potential of this tube is raised as a result of a D. C. signal-component making an appearance at the tube's control grid 3. Therefore, the effect upon the raw and the filtered power supply are quite similar, both resulting in a lowering of plate supply voltage as the output tube's plate current increases. This lowering of the plate supply voltage again reduces the cathode-resistor preloading-current of the input tube, raising that tube's plate current and lowering the output tube's plate current, thus producing the additional self-focusing effect described before in connection with the function of switch $S_2$.

In its lower position, switch $S_4$ ties the plate supplies of both tubes together, leaving the plate supply filter out of the circuit. This connection might be selected if the plate supply terminal 12 delivers a plate power sufficiently free from ripple and other disturbances.

*Switch* $S_5$.—This switch controls the output tube's cathode-resistor-bypass-condenser, inserting it in its lower, preferred position into the circuit between the cathode and ground and in its upper position, representing certain practices of prior art, between the cathode and the positive plate supply terminal 12. Preference is given to the lower position as shown in the drawing since the condenser may then be insulated for lower voltages which reduces its production costs.

*Switch* $S_6$.—This switch, in its left position shown, connects in parallel with the cathode resistor 10 of the input tube 1 a condenser 21 in order to stabilize the cathode potential of that tube against degeneration. However, with a sufficiently large preloading-current-to-tube-current-ratio this condenser may be omitted since degeneration would be negligible anyhow. In that case switch $S_6$ would be placed in its right position.

*Switch* $S_7$.—This last switch in Fig. 1, in its lower position, as shown, connects in parallel with tap 6 on the output tube's cathode resistor 5 a by-passing condenser 22 in order to reduce the amplitudes of A. C. potentials which the overall-cathode-resistor-bypass-condenser 8 of the output tube should fail to filter out. Again this condenser may be omitted or switch $S_7$ may be used in its upper, open position if condenser 8 provides sufficient filter action or if a certain, limited amount of A. C. feedback should be permissible or even desirable.

It goes without saying that condenser 22 may be used in various other although similar manners than the one shown in Fig. 1. Thus its left terminal 23 which is shown grounded may, for instance, be connected to any other point of the circuit against which tap 6 on the output tube's cathode resistor should be stabilized. Such points may be cathode 9 of the input tube or the positive plate supply terminal 12 and others.

In summarizing my invention as shown in Fig. 1, it consists in the operation of the circuit with switch $S_1$ in its upper and switch $S_2$ in its left closed position, which combination provides strong focus-trap-free self-focusing action. Furthermore, an improvement in performance with regard to hum and feedback can be obtained if switch $S_3$ is placed in its right position providing "floating input" between the input tube's cathode and control grid, neither of them representing a fixed point in the circuit, the input tube's bias and self-focusing potential being applied through a separate circuit which is connected to a tap on the output tube's cathode resistor. In addition, the output tube's plate current, its screen supply, the input tube's plate current and its cathode resistor preloading circuit may be connected to the same positive power supply terminal or they may be separated in groups by a power supply filter. The output tube's cathode resistor should be bypassed by a condenser. However, contrary to previous practice in the art, I prefer connecting this bypass-condenser between the cathode and ground instead of between the cathode and the positive terminal of the plate power supply. The cathode resistor of the input tube being preloaded and reduced in size in order to reduce degeneration, should be by-passed if only lightly preloaded but may be left unby-passed if heavier preloaded. Finally, a by-passing condenser may be provided between the self-focusing tap of the output tube's cathode-resistor and either ground or the input tube's cathode or any other suitable point, thus reducing negative feedback of A. C. frequencies which have escaped the output tube's cathode-resistor-by-pass-condenser.

The circuit in Fig. 1, in order to demonstrate the basic principle of my invention only, has been drawn as simple as possible. In actual designing practice numerous modifications of it may seem desirable and possible. Amongst them are various filter elements which may be inserted in the circuit shown. Thus, for instance, the self-focusing lead 24 between tap 6 on the output tube's cathode resistor and the cathode-grid control-circuit of the input tube may be cut at point 25 and a filter resistor may be inserted in order to reduce the possibility of transmitting remnant A. C. potentials and hum through this lead.

The amplifier shown in Fig. 1, furthermore, is a two-stage amplifier. Obviously, the principle outlined may also be applied to three and four-stage amplifiers and, broadly speaking, to amplifiers comprising any number of stages. Obviously, there should however be taken into consideration the question whether the number of stages is even or odd. If it is even, a cathode-to-grid feedback circuit will provide the desired self-focusing action in a similar manner as shown in Fig. 1 or any similar circuit between elements of the input tube and the output tube. If the number of stages is odd, all voltage-phenomena are phase-reversed. Thus, the feedback circuit should be connected between the output tube's cathode and the input tube's cathode or between the output tube's plate and the input tube's grid, etc. Furthermore, the input tube might be self-focused through its screen or suppressor grids if it should happen to be a multigrid tube. The circuit may be basically the same or similar to the one shown in Fig. 1.

Attention should also be called to the fact that if the input tube is a screen-grid tube, the circuit shown in Fig. 1 may be modified in various manners which may or may not involve the tube's screen and, possibly, suppressor for additional self-focusing action. If the screen is not being used for that purpose, it may be connected in any manner customarily employed. If it should, however, be used, it may be connected in a manner similar to the input tube's control grid. Fig. 2 shows a typical circuit of this kind.

The diagram reproduced in Fig. 2 is similar to the one in Fig. 1 except that all switches have been omitted and both tubes are pentodes. Furthermore, an actual plate power supply is shown employing a rectifier-tube 31 which charges two filter condensers 32 and 33 which are interconnected through a filter resistor 34. The circuit, which is intended to be used for a phonograph audio amplifier has two positive power supply terminals, viz., the raw supply terminal (+1) marked 35 and the filtered supply terminal (+2) marked 36. The plate 37 of the output tube 38 and the speaker-primary 39 are connected to terminal 35, and all other power consuming circuits are connected to the filter terminal 36.

The signal input circuit consists, in this case, of a crystal pickup 40 which is connected to the input tube's control grid 41 and the cathode 42 of the same tube 43. The tube is biased through leak 44 from tap 45 of the output tube's cathode resistor 46. In addition, its cathode is grounded through a resistor 47 which is preloaded from the positive power supply through resistor 48.

The circuit described thus far is identical with the one in Fig. 1 with switches $S_1$, $S_2$, $S_3$, $S_4$ and $S_5$ in their drawn positions, and $S_6$ and $S_7$ opened, in other words, the two extra by-passing condensers being omitted. Added to it are the input tube's screen grid 49 and suppressor 50. The latter is, in this case, connected to the tube's cathode, although it may also be connected to an additional self-focusing circuit. The screen 49, through a second self-focusing lead 51, is connected to a tap 52 on the output tube's cathode-resistor 46. The two tubes are therefore tied together by a total of three leads. They are the direct plate-grid coupling lead 53, the first self-focusing lead 54, which supplies the positive bias potential to the input tube's control grid, and the second screen-focus-lead 51. Either self-focusing lead 54 or 51 may, in addition to the circuits shown in Fig. 2, be equipped with hum filtering elements, capacitive bypasses, etc. However, if the output tube's cathode-resistor-bypass-condenser 55 is made large enough, these circuit-elements may often be omitted.

Modifications of the circuit in Fig. 2 may, amongst numerous possibilities, include a connection of the input tube's suppressor 50 to lead 54 or the connection of screen 49 to any other suitable point of positive potential, including the positive power supply terminal 36. In the latter case, the screen would, of course, not participate in the self-focusing action of the circuit.

When applying the circuit shown in Fig. 2 to radio-receivers, the input tube may, as illustrated in Fig. 3, be used as a grid leak detector. The circuit in Fig. 3 is a repetition of the circuit in Fig. 2, except that the crystal pickup has been replaced by an intermediate frequency transformer 61 which is connected to the control grid 62 of the input tube 63 through a load resistor 64 across which the detected audio-voltage is being developed as condenser 65, being in parallel with this resistor, is being charged by I. F. impulses. The output tube 66 has, in this case, been combined with the power-rectifier tube. The output tube's cathode resistor 67 performs the functions of a volume control by supplying varying negative bias potentials to the oscillator-mixer tube 68. In order to obtain this effect, the cathode 69 of the oscillator-mixer is connected to the cathode 70 of the output tube. Since the latter is by-passed by a large condenser 71, the tuning and tracking of the oscillator-mixer's antenna tuning system $L_1$—$C_1$ and oscillator tuning system $L_2$—$C_2$ are not disturbed by transferring the oscillator-mixer's negative plate supply return from its conventional ground position to the unconventional position shown. Volume control is obtained by sliding contact 72 along the output tube's cathode resistor 67. In its lowest position the oscillator-mixer's antenna-grid 73 is highly negative with reference to the tube's cathode 69, in other positions it is less negative. Thus, the oscillator-mixer's translation-gain can be controlled. It should also be noted that this arrangement provides a certain amount of automatic volume control. If sliding contact 72 should, for instance, be in its half-way position and a powerful carrier-signal should be applied to the receiver's loop $L_1$, the grid-leak detector would raise the output tube's plate current. This raise would, of course, be counteracted by the self-focusing properties of the circuit. However, a limited increase of the output tube's cathode potential will be noted, also an increase of the potential-difference between the output tube's cathode 70 and the gliding contact 72 on the volume control. Therefore, the negative bias, applied to the oscillator-mixer, will automatically increase itself with increasing carrier levels, which means that there is a certain amount of A. V. C. prevalent.

It will be obvious to those skilled in the art that the circuit described and illustrated in Fig. 3 may be easily modified into a T. R. F. or super-regenerative circuit or into other types of radio circuits. The direct-coupled audio-amplifier shown may easily be employed in connection with those other types of radio circuits and manual as well as automatic volume control may be obtained in a similar manner, as illustrated in connection with the superheterodyne circuit in Fig. 3.

An important point of design which all direct-coupled audio amplifiers have in common is that on one hand the "coupling potential," i. e., the zero-signal plate-voltage of the input tube which equals the zero-signal potential of the control-grid of the output tube, should be kept as low as possible in order to increase the output tube's available maximum power output. On the other hand, it is equally important to have the input tube operate on a linear section of its plate characteristic.

I have discovered that triodes, as well as screengrid tubes, can be made to have perfectly linear plate voltage curves down to almost zero plate-voltage if they are operated at comparatively low plate currents in connection with fairly large load resistors. Fig. 4 illustrates this relationship.

In Fig. 4 I have plotted the output-plate-voltage of a certain triode acting as an input tube in a direct-coupled amplifier according to Fig. 1. Plate-voltage curves are shown as a function of grid bias as well as varying load resistors. The plate-supply-voltage is in all cases 100. It will be noted that some of the curves are perfectly straight in their upper section and others in their lower section. Thus, the 200 kilo-ohm-curve is straight in its upper part but begins to curve above 20 volts output voltage in its lower part, whilst the 2 megohm-curve is curved above 40 volts but remains perfectly straight down to 5 volts or less. From the curves in Fig. 4 it is obvious, and similar curves can be plotted for pentodes and other types of tubes, that the plate-voltage-output-curve of an amplifier tube moves the midpoint of its straight portion downward as the plate current is being decreased. Therefore, if such a tube is to operate at low coupling voltages in a straight section of its plate curve, its plate current should be reduced and its load resistor increased until the conditions mentioned are fulfilled. In the case of screengrid tubes this might be accompanied by a lowering of screen potentials from conventional values such as 100 or 80 volts down to 25, 15, 10 or even less volts.

Having fully recognized the necessity of lowering tube currents in the manner described above and raising load-resistances until straight portions of the output plate voltage curves near zero-volts are obtained, I have named these tube characteristics the "lowered lower bend characteristics" and their application to direct-coupled amplifiers "lowered lower bend operation of direct-coupled amplifiers." Since I consider the recognition of these facts and their significance with regard to distortion-free operation of direct coupled amplifiers as well as the obtaining of maximum power output from such amplifiers to be of particular significance, I have defined lowered-lower-bend-operation as follows and I shall repeat this definition in the appended claims: A vacuum tube is being operated on its lowered-lower-bend-characteristics if with a given load resistor the lowest output plate voltage on the straight portion of its plate voltage characteristic equals less than ⅓ the voltage-difference between the plate supply voltage and the highest voltage on the straight portion of its plate voltage characteristic. This definition is illustrated by the voltage-curve and tube circuit in Figs. 5 and 6.

In Fig. 5 curve 81 represents the voltage between the tube's cathode and plate as measured by voltmeter 82 in Fig. 6. This voltage is a function of the tube's bias voltage as measured by voltmeter 83 in Fig. 6 with the plate supply voltage being held constant. The latter is measured by voltmeter 84 in Fig. 6. According to my definition, the lowest voltage on the straight portion 85—86 is the distance mark 87. It should be less than ⅓ of the distance 88, which is the difference between the plate supply voltage 89 and the upper end of the curve's straight portion 86. In the case illustrated, this condition is obviously fulfilled since distance 87 is less than ⅓ of distance 88.

As mentioned before, there are numerous ways in which the desired lowered-lower-bend-shape of curve 81 can be obtained. Thus, if in Figs 1, 2 and 3 the input tube's load resistance is made 1 megohm or larger, and if in Figs. 2 and 3 the potential of the input tube's screen is kept lower than 30 volts, this condition should be fulfilled for almost all tube-types available today. An important factor in this connection also is the tube's grid bias. A high negative control-grid bias has, for instance, a similar effect upon the shape of the output voltage curve as a lowering of the tube's screen potential. Suffice it to say that I have found that such direct coupled amplifiers can be operated without noticeable distortion at unusually low coupling voltages such as 10 or 15 volts if their input tubes are operated on their lowered-lower-bend-characteristic as specified above.

Figure 7:
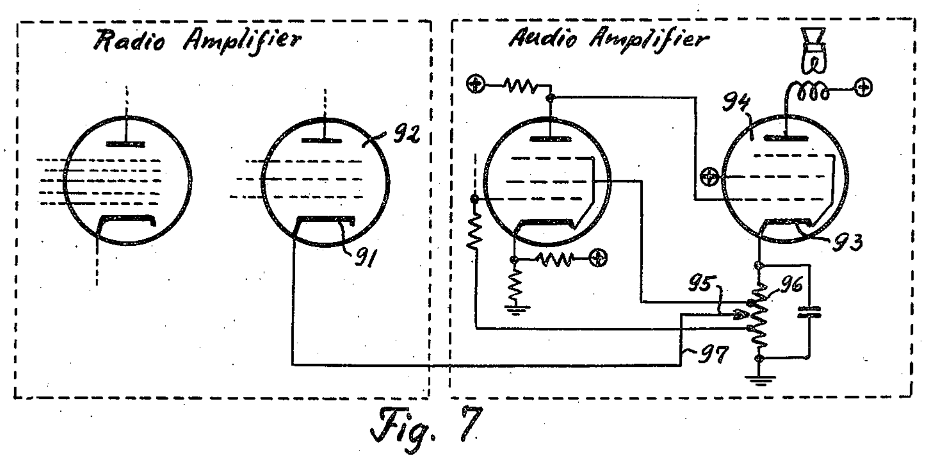
Figure 8:
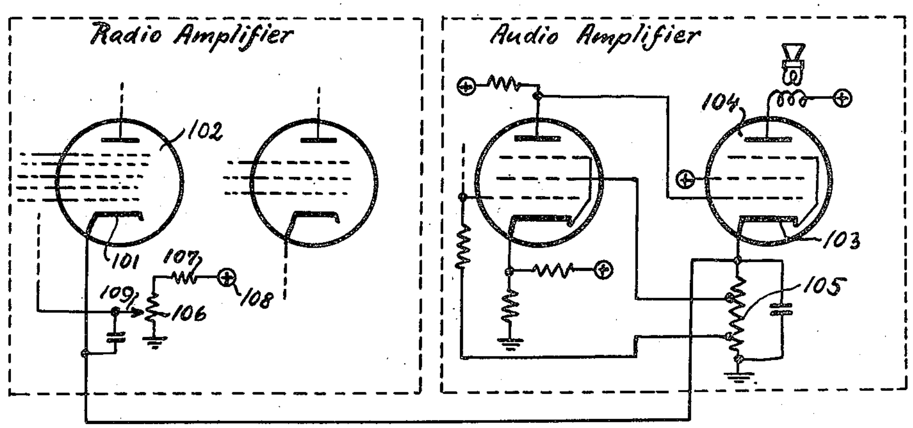
Figure 9:
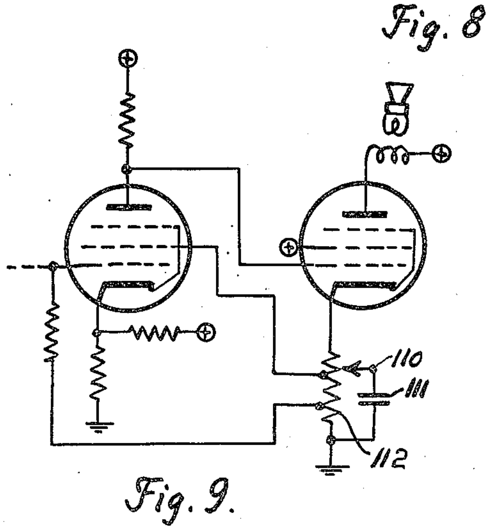

Figs. 7, 8, and 9 show modifications of manual and automatic volume controls which may be used in connection with this amplifier.

The circuit in Fig. 7 is similar to the one in Fig. 3 as far as biasing the radio amplifier tubes from the cathode resistor of the audio output tube is concerned. However, instead of connecting the cathode 91 of the radio tube 92 to the cathode 93 of the audio output tube 94 and connecting the radio-tube's grid circuit to the gliding contact 95 of the audio-output-tube's cathode-resistor 96, as was the case in the circuit in Fig. 3, the cathode 91 of the radio tube is, in this case, connected to the gliding contact 95 of the output tube's cathode resistor, and the grid circuit of the radio-tube is grounded through connections not shown in the diagram. Thus, the R. F. or I. F. current passing the radio-amplifier tube also flows through the lower section of the audio tube's cathode resistor 96 between its gliding contact 95 and ground. If more than one radio tube is being controlled in this manner, it may occasionally be necessary to by-pass the volume control lead 97 to ground or any other suitable fixed point in order to avoid inter-tube feedback and oscillations. In most cases, however, the low-ohm cathode-resistor of the audio output tube will be found to be sufficiently "stiff" with regard to weak R. F. and I. F. currents to make such precautions unnecessary.

Fig. 8 shows a different circuit which provides an extrasensitive automatic volume control. This "amplified automatic volume control" (AAVC) circuit provides a fixed connection of one or more radio-amplifier-tube-cathodes such as cathode 101 of tube 102 to the cathode 103 of the audio-output-tube 104 or any suitable fixed point on the latter's cathode resistor 105. The control-grid-circuits of these radio-tubes are, however, connected to a potentiometer 106 which through a series resistor 107 is connected to the positive terminal 108 of the plate power supply. The gliding contact 109 of this potentiometer to which the grid circuit of radio tube 102 is connected assumes, according to its position, varying positive potentials against ground. By properly selecting resistance values in this circuit, the potential of sliding contact 109 in its uppermost position may be made to be equal or nearly equal to the positive potential of the audio-output-tube's cathode 103. Therefore, at zero signal, the radio tube is then nearly unbiased, giving its maximum gain. With increasing carrier levels the output tube's cathode becomes more and more positive, but since the potential of sliding contact 109 remains either unchanged or is even lowered as a result of the set's heavier drain on its power supply, the radio-tube automatically biases itself, providing its own automatic volume control. Another manner in which the radio tube may be biased for the purpose of manual volume control is by turning the sliding contact 109 down. Manual and automatic volume control operate in a similar manner and simply add to each other.

Still another kind of volume control is shown in Fig. 9. It is purely manual and consists in shifting one of the terminals, for instance the upper terminal 110, of bypass condenser 111 across the output tube's cathode resistor 112. In its lowest position the output tube and possibly also the input tube operate heavily degeneratively, providing little gain and a small output. In its uppermost position degeneration is at its minimum and the output-volume high.

The circuits described and illustrated represent but a small collection of examples amongst numerous other possible applications of my invention. Furthermore, my invention is not restricted to the type of amplifiers shown but may be used for higher and lower frequency ranges in all branches of the electronic field.

The various by-passing condensers shown in Fig. 1 may, of course, also be used in the circuits of Figs. 2, 3, 7, 8 and 9.

What I claim is:

1. A self-focusing direct-coupled amplifier having an input tube and an output tube each having cathode, plate and grid elements, a positive power supply terminal connected to the plate of said input tube through a first load element, the plate of said output tube being connected through a second load element to said positive terminal, a conductive connection from the plate of the input tube to the grid of the output tube, a negative power supply terminal connected to the cathode of said input tube through a first cathode resistor, the cathode of said output tube being connected through a second cathode resistor to said negative terminal, said second cathode resistor being capacitively bypassed and tapped at a tapping point, and a conductive connection from said tapping point to the grid of said input tube for applying to said grid a biasing potential which is positive with respect to said negative terminal, and a preloading conductive path connected from the cathode of said input tube to said positive terminal for applying to said cathode a positive biasing voltage greater than the voltage applied to said grid, whereby the grid of said input tube is biased negatively with respect to the cathode of said input tube, the value of the current supplied to said first cathode resistor by said preloading connection being a multiple of the value of the plate current of said input tube.

2. A self-focusing direct-coupled amplifier having an input tube having cathode, grid, screen-grid and plate elements and an output tube having cathode, grid and plate elements, a positive power supply terminal connected to the plate of said input tube through a first load element, the plate of said output tube being connected through a second load element to said positive terminal, a conductive connection from the plate of the input tube to the grid of the output tube, the cathode of said input tube being connected through a first cathode resistor to said negative terminal, the cathode of said output tube being connected through a second cathode resistor to said negative terminal, said second cathode resistor being capacitively bypassed and tapped at a first tapping point and at a second tapping point, a first conductive feedback connection from said first tapping point to the control grid of said input tube for applying to said grid a biasing potential which is positive with respect to said negative terminal, a second conductive feedback connection from said second tapping point to the screen-grid of said input tube, and a cathode preloading path connected from said first cathode of said input tube to said positive terminal for applying to said cathode a positive biasing voltage greater than the voltage applied to said grid, whereby the grid of said input tube is biased negatively with respect to the cathode of said input tube, the value of the current supplied to said first cathode resistor by said preloading connection being a multiple of the value of the plate current of said input tube.

3. An amplifier according to claim 1 wherein the cathode resistor of said input tube is bypassed by a condenser connected between said input tube's cathode and said negative terminal of said common power supply.

4. An amplifier according to claim 2 wherein said cathode resistor of said input tube is bypassed by a condenser connected between said input tube's cathode and said negative terminal of said common power supply.

5. A volume control circuit for radio receivers having an audio-amplifier according to claim 1 and a radio amplifier supplied from said common power supply, and a connection from the cathode return circuit of a radio amplifier tube to the cathode circuit of an audio amplifier tube.

6. A volume control circuit for radio receivers having an audio-amplifier according to claim 2 and a radio amplifier supplied from said common power supply, and a connection from the cathode return circuit of a radio amplifier tube being connected to the cathode circuit of an audio amplifier tube.

7. A volume control circuit for radio receivers having a radio-amplifier and an audio amplifier according to claim 1, said cathode resistor of said output tube having a sliding contact, and a connection by which said contact supplies a variable negative bias to said radio-amplifier.

8. A volume control circuit for radio-receivers having a radio-amplifier and an audio-amplifier according to claim 2, said cathode resistor of said output tube having a sliding contact, and a connection by which said contact supplies a variable negative bias to said radio-amplifier.

9. An amplifier according to claim 1 wherein said input tube is operated on its "lowered-lower-bend-characteristic," its lowest output plate voltage on the straight portion of its output-plate-voltage characteristic being less than one-third of the voltage-difference between the plate-supply-voltage and the highest voltage on the straight portion of said output-plate-voltage characteristic.

10. An amplifier according to claim 2 wherein said input tube is operated on its "lowered-lower-bend-characteristic," its lowest output voltage on the straight portion of its output-plate-voltage-characteristic being less than one-third of the voltage-difference between the plate-supply-voltage and the highest voltage on the straight portion of said output-plate-voltage-characteristic.

11. A volume control circuit for radio receivers having a radio amplifier and an audio amplifier according to claim 1, the cathode-grid control circuit of a radio-amplifier-tube being connected to a voltage divider between said positive terminal of said common power supply and ground, and the cathode of said radio tube being connected to the cathode circuit of said output tube of said audio amplifier.

12. A volume control circuit for radio receivers having a radio amplifier and an audio amplifier according to claim 2, the cathode grid control circuit of a radio-amplifier-tube being connected to a voltage divider between said positive terminal of said common power supply and ground, and the cathode of said radio tube being connected to the cathode circuit of said output tube of said audio amplifier.

WALTER K. VOLKERS.

REFERENCES CITED

The following references are of record in the file of this patent:

UNITED STATES PATENTS

| Number | Name | Date |
|---|---|---|
| 1,954,779 | Kelley | Apr. 10, 1934 |
| 2,026,944 | Knight | Jan. 7, 1936 |
| 2,211,914 | Soller | Aug. 20, 1940 |
| 2,313,122 | Brubaker | Mar. 9, 1943 |

FOREIGN PATENTS

| Number | Country | Date |
|---|---|---|
| 462,564 | Great Britain | Mar. 11, 1937 |